United States Patent [19]

Ikeura

[11] 4,445,477
[45] May 1, 1984

[54] METHOD AND APPARATUS FOR IGNITION SYSTEM SPARK TIMING CONTROL DURING NO-LOAD ENGINE OPERATION

[75] Inventor: Kenji Ikeura, Yokosuka, Japan

[73] Assignee: Nissan Motor Co., Ltd., Yokohama, Japan

[21] Appl. No.: 504,245

[22] Filed: Jun. 17, 1983

Related U.S. Application Data

[60] Division of Ser. No. 379,033, May 17, 1982, abandoned, which is a continuation of Ser. No. 136,996, Apr. 3, 1980, abandoned.

[30] Foreign Application Priority Data

Apr. 9, 1979 [JP] Japan ................................. 54-45281

[51] Int. Cl.³ .......................... F02D 5/00; F02B 3/00
[52] U.S. Cl. ................................... 123/416; 123/417; 123/418; 364/431.07
[58] Field of Search ............... 123/416, 417, 418, 415, 123/431, 150.21, 420; 180/170

[56] References Cited

U.S. PATENT DOCUMENTS

| | | | |
|---|---|---|---|
| 3,815,560 | 6/1974 | Wahl et al. | 123/418 |
| 3,853,103 | 12/1974 | Wahl et al. | 123/117 R |
| 3,969,614 | 7/1976 | Mayer et al. | 235/150.21 |
| 4,009,699 | 3/1977 | Hetzler et al. | 123/117 D |
| 4,015,565 | 4/1977 | Aono et al. | 123/117 D |
| 4,127,091 | 11/1978 | Léichlé | 123/416 |
| 4,207,847 | 6/1980 | Hattori et al. | 123/416 |
| 4,225,925 | 9/1980 | Hattori et al. | 123/416 |
| 4,231,091 | 10/1980 | Motz | 123/417 |
| 4,244,023 | 1/1981 | Johnson | 123/417 |
| 4,255,789 | 3/1981 | Hartford et al. | 364/431 |
| 4,258,683 | 3/1981 | Hattori et al. | 123/416 |
| 4,258,684 | 3/1981 | Schira | 123/416 |

*Primary Examiner*—Raymond A. Nelli
*Attorney, Agent, or Firm*—Lane, Aitken & Kananen

[57] ABSTRACT

A method and apparatus for controlling ignition system spark timing. It is detected whether the engine is in operation with no load or in the remaining operating conditions. A digital processor is provided which uses a mathematical formula or table during no load engine operation to find value of spark advance, which mathematical formula or table is distinct from a mathematical formula or table to be used during the remaining engine operating conditions to find value of spark advance.

14 Claims, 9 Drawing Figures

METHOD AND APPARATUS FOR IGNITION SYSTEM SPARK TIMING CONTROL DURING NO-LOAD ENGINE OPERATION

This application is a division, of application Ser. No. 379,033, filed May 17, 1982, which is a continuation of Ser. No. 136,996, filed Apr. 3, 1980, both now abandoned.

CROSS-REFERENCES TO RELATED APPLICATIONS

References are made to the following related co-pending applications, each filed in the name of Kenji Ikeura on Apr. 3, 1980:
 (1) U.S. Patent application Ser. No. 137,001;
 (2) U.S. Patent application Ser. No. 136,959, now U.S. Pat. No. 4,314,540, issued Feb. 9, 1982.
 (3) U.S. Patent application Ser. No. 137,000; and
 (4) U.S. Patent application Ser. No. 136,994, now U.S. Pat. No. 4,314,540, issued Feb. 9, 1982.

BACKGROUND OF THE INVENTION

The present invention relates to a method and apparatus for the control of an ignition system spark timing for a spark ignition internal combustion engine, and more particularly to a method and apparatus for the control of an ignition system spark timing during no load engine operation.

Recently, electronic spark timing controls have been developed which employ a processor, such as a microcomputer, to determine a spark timing (an advance value or a delayed value) based upon the engine operating parameters such as engine revolution speed and load. The electronic spark timing control features that, as compared to the mechanical advance unit like the conventional centrifugal spark advance mechanism or vacuum advance mechanism, there is substantially no limitation to the selection in the value of spark advance so that the optimum spark advance value can be set without any difficulty.

In the conventional system wherein a spark timing is set in accordance with the revolution speed and load (the load is detected with induction vacuum or intake air flow or the pulse width of a fuel injection pulse), since it is difficult to make a distinction between an idling or a coasting operation and a low load (light load) operation, if a value of spark advance is set large enough for low load operation like operation at a vehicle speed of 20 km/h, it results in a large value of a spark advance at the idling operation when the revolution speed and the load are substantially similar to those for a low load operation, thereby to cause instable idling or hunting in the revolution speed, while, if a relatively delayed value of spark advance is set for warm-up operation, it causes a deterioration in driveability.

SUMMARY OF THE INVENTION

According to the invention, there is provided a method for the control of an ignition system spark timing for a spark ignition internal combustion engine for an automotive vehicle, said method comprising:
 a step of detecting a condition that said engine is in operation with no load to provide a no load indicative signal indicating that said engine is in operation with no load;
 a step of determining a value of spark advance along with a first predetermined spark advance vs. engine speed characteristic in response to the absence of said no load indicative signal;
 a step of determining a value of spark advance along with a second predetermined spark advance vs. engine speed characteristic in response to the presence of said no load indicative signal;
 said second predetermined spark advance vs. engine speed characteristic being distinct from said first predetermined spark advance vs. engine speed characteristic; and
 a step of producing a spark in accordance with that value of spark advance which has been determined.

According to another aspect of the invention, there is provided a method for the control of an ignition system spark timing for a spark ignition internal combustion engine for an automotive vehicle, said method comprising:
 a step of detecting a condition that the engine is under cranking to provide a cranking signal indicating that the engine is under cranking;
 a step of detecting a condition that said engine is in operation with no load to provide a no load indicative signal indicating that said engine is in operation with no load condition;
 a step of detecting the engine temperature of said engine to provide a temperature signal indicating that the engine temperature is higher than a predetermined engine temperature value;
 a step of detecting the vehicle speed of said vehicle to provide a vehicle speed signal indicating that the vehicle speed is higher than a predetermined vehicle speed value;
 a step of determining a value of spark advance along with a first predetermined spark advance vs. engine speed characteristic in response to the absence of said cranking signal, the presence of said no load indicative signal, the absence of said temperature signal, and the presence of said vehicle speed signal;
 a step of determining a value of spark advance along with a second predetermined spark advance vs. engine speed characteristic in response to the absence of said cranking signal, the presence of said no load indicative signal, the presence of said temperature signal, and the presence of said vehicle signal;
 said second predetermined spark advance vs. engine speed characteristic being distinct from said first predetermined spark advance vs. engine speed characteristic; and
 a step of producing a spark in accordance with that value of spark advance which has been determined.

According to still another aspect of the present invention, there is provided an apparatus for the control of an ignition system spark timing for a spark ignition internal combustion engine, said apparatus comprising:
 means for detecting a condition that said engine is in operation with no load to provide a no load indicative signal indicating that said engine is in operation with no load;
 a micro processor responsive to at least said no load indicative signal, said micro processor including a read-only-memory storing a first predetermined spark advance vs. engine speed characteristic and a second predetermined spark advance vs. engine speed characteristic which is distinct from said first predetermined spark advance vs. engine speed characteristic, and a central processing unit which performs a table look-up of said first predetermined spark advance vs. engine speed characteristic stored in said read-only-memory in response to the absence of said no load indicative signal to determine a value of spark advance and performs a table look-up of said second predetermined spark advance vs. engine speed characteristic stored in said read-only-memory in response to the presence of said no load indicative signal to determine a value of spark advance, said micro processor generating an output signal indicative of that value of spark advance which has been determined by said central processing unit; and means for producing a spark in response to said output signal.

According to still another aspect of the present invention, there is provided an apparatus for the control of an ignition system spark timing for a spark ignition internal combustion engine for an automotive vehicle, said apparatus comprising:

means for detecting a condition that the engine is under cranking to provide a cranking signal indicating that the engine is under cranking;

means for detecting a condition that said engine is in operation with no load to provide a no load indicative signal indicating that said engine is in operation with no load;

means for detecting the engine temperature of said engine to provide a temperature signal indicating that the engine temperature is higher than a predetermined engine temperature value;

means for detecting the vehicle speed of said automotive vehicle to provide a vehicle speed signal indicating that the vehicle speed is higher than a predetermined vehicle speed value;

a micro processor responsive to said cranking signal, said no load indicative signal, said temperature signal and said vehicle speed signal, said micro processor including a read-only-memory storing a first predetermined spark advance vs. engine speed characteristic and a second predetermined spark advance vs. engine speed characteristic which is distinct from said first predetermined spark advance vs. engine speed characteristic and a central processing unit which performs a table look-up of said first predetermined spark advance vs. engine speed characteristic stored in said read-only-memory in response to the absence of said cranking signal, the presence of said no load indicative signal, the presence of said temperature signal, and the presence of said vehicle speed signal to determine a value of spark advance and performs a table look-up of said second predetermined spark advance vs. engine speed characteristic stored in said read-only-memory in response to the absence of said cranking signal, the presence of said no load signal, the absence of said temperature signal, and the absence of said vehicle speed signal to determine a value of spark advance, said micro processor generating an output signal indicative of that value of spark advance which has been determined; and means for producing a spark in response to said output signal.

According to still another aspect of the present invention, there is provided an apparatus for the control of an ignition system spark timing for a spark ignition internal combustion engine for an automotive vehicle, said apparatus comprising:

means for detecting a condition that the engine is under cranking to provide a cranking signal indicating that the engine is under cranking;

means for detecting a condition that said engine is in operation with no load to provide a no load indicative signal indicating that said engine is in operation with no load;

means for detecting the engine temperature of said engine to provide a temperature signal indicating that the engine temperature is higher than a first predetermined engine temperature value and lower than a second predetermined engine temperature value which is higher than said first predetermined engine temperature value;

means for detecting the vehicle speed of said automotive vehicle to provide a vehicle speed signal indicating that the vehicle speed is higher than a predetermined vehicle speed value;

a micro processor responsive to said cranking signal, said no load indicative signal, said temperature signal and said vehicle speed signal, said micro processor including a read-only-memory storing a first predetermined spark advance vs. engine speed characteristic and a second predetermined spark advance vs. engine speed characteristic which is distinct from said first predetermined spark advance vs. engine speed characteristic and a central processing unit which performs a table look-up of said first predetermined spark advance vs. engine speed characteristic in response to the absence of said cranking signal, the presence of said no load indicative signal, the absence of said temperature signal, and the presence of said vehicle speed signal to determine a value of spark advance and performs a table look-up of said second predetermined spark advance vs. engine speed characteristic stored in said read-only-memory in response to the absence of said cranking signal, the presence of said no load indicative signal, the presence of said temperature signal, and the absence of said vehicle speed signal to determine a value of spark advance, said micro processor generating an output signal indicative of that value of spark advance which has been determined; and means for producing a spark in response to said output signal.

The invention may be better understood by reference to the detailed description which follows and to the drawings.

DETAILED DESCRIPTION OF THE INVENTION

Figure 1:
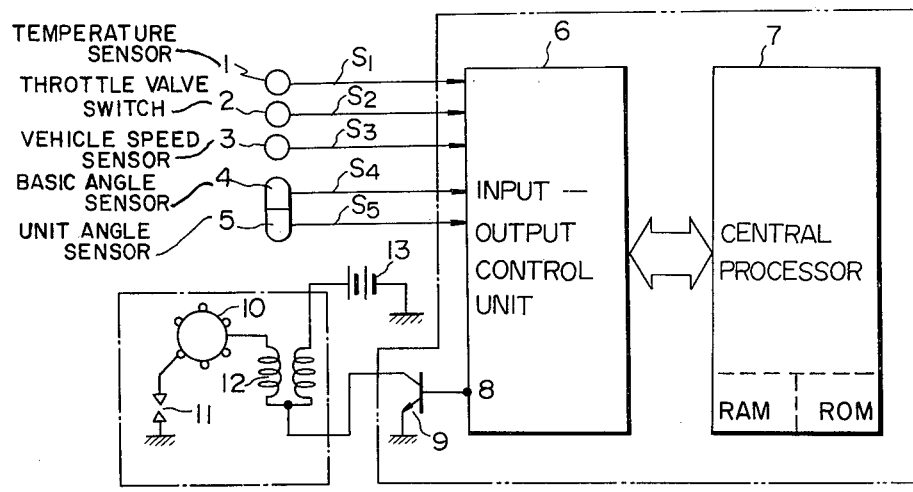
FIG. 1 is a block diagram of one embodiment of the present invention.

FIG. 1 is a block diagram showing an embodiment of the present invention. In FIG. 1, the reference numeral 1 designates a temperature sensor which provides a signal $S_1$ representing engine coolant temperature, numeral 2 designates a throttle valve switch which provides an ON-OFF signal $S_2$ in response to an opened or closed state by detecting the state of opening or closing of the throttle valve of an engine, numeral 3 designates a vehicle speed sensor which provides a vehicle speed signal $S_3$ by detecting the speed of a vehicle propelled by the engine, numeral 4 designates a basic angle sensor which provides basic angle pulses $S_4$ each upon an expiration of a basic angle (for example, 120°) as the crank shaft rotates, and numeral 5 designates an unit angle sensor which provides unit angle pulses $S_5$ each upon an expiration of an unit angle (for example, 1°) as the crank shaft rotates. These signals $S_1$ to $S_5$ from the respective sensors 1 to 5 (if necessary, other signals including a signal representing the induction vacuum of the engine, a signal representing an idle condition of the engine, a fuel injection pulse signal and/or a gear position signal may be used) are read in via an input-output control unit 6 that is constructed of semiconductors by a central processor 7 including a ROM (read only memory), a RAM (random access memory), and a CPU (central processor unit). The central processor 7 detects an engine state based upon the read signals $S_1$ to $S_5$ and finds a value of spark advance, and instructs this value to that section of the input-output control unit 6 which performs the spark advance control. The input-output control unit 6 provides, at a spark output terminal 8, an output that carries an information that current be passed or interrupted for generating a spark, based upon the signals $S_4$ and $S_5$ of the basic angle sensor 4 and the unit angle sensor 5, thus controlling the operation of a transistor 9 which turns on or off electric current passing through an ignition coil 12 of an ignition system as enclosed by a rectangle shown by a one-dot chain line in FIG. 1. The reference numeral 10 designates a distributor, numeral 11 designates a spark plug, and numeral 13 designates a battery for a source of electricity. It is understood in the art that the engine revolution speed can be found based upon the signal $S_5$ of the unit angle sensor 5. Owing to the benefit of recent progress in semiconductor techniques, it is now possible to easily manufacture and use a unit integrally combining a central processor 7 with an input-output control unit 6 and which also has a built-in transistor 9, as shown by the rectangle formed by the two-dots chain line in FIG. 1.

Figure 2:
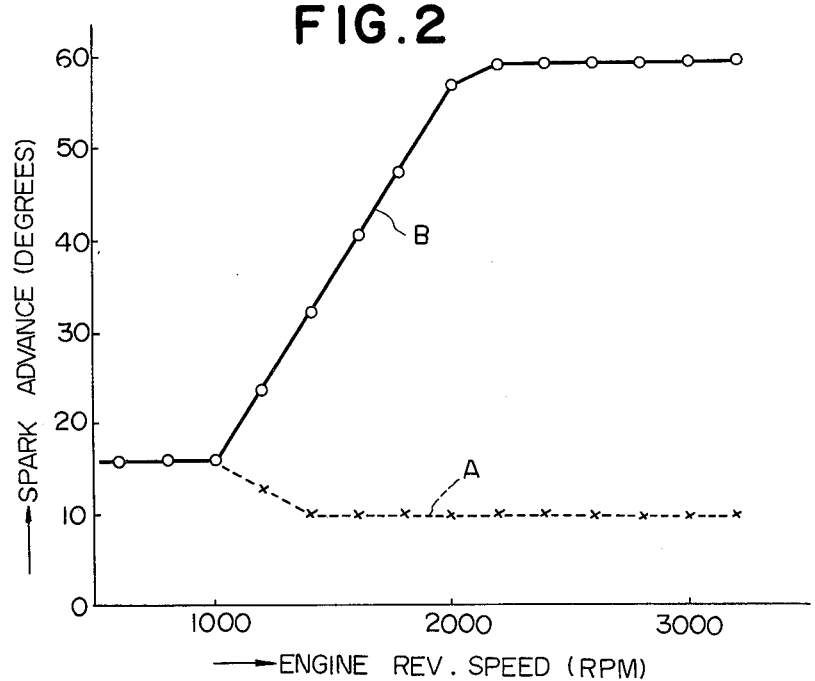
FIG. 2 is a graph of engine-speed spark-advance versus engine speed according to the present invention, showing an ordinary-in-use characteristic curve B and a relatively delayed characteristic curve A.
Figure 3:
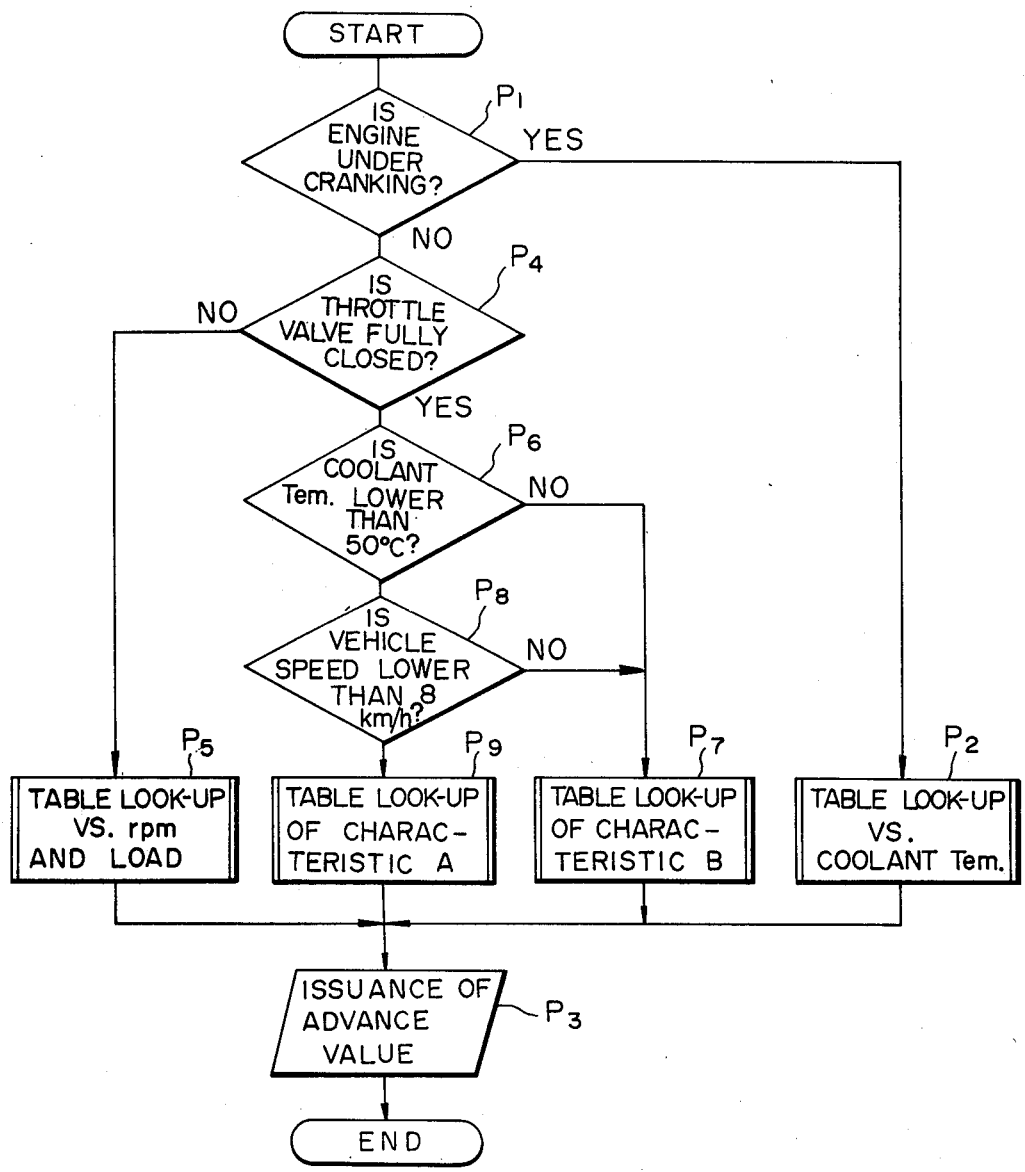
FIG. 3 is flow chart illustrative of the operation of the central processor used to determine the value of the spark advance.

FIG. 2 shows engine-speed spark-advance curves A and B employed in the present invention, while, FIG. 3 is a flow chart illustrative of the operation of the central processor 7 used to determine the value of spark advance. Referring to FIG. 3, when the program starts, a decision is made in step $P_1$ whether the engine is under cranking or not, and if the engine is under cranking, the program goes to a step $P_2$ and table look-up of a table for engine start-up is effected in accordance with engine coolant temperature, resulting in issuance of the result of the table look-up, as an output value of spark advance, via a step $P_3$. If, in step $P_1$, the engine is not under cranking, the program goes to a step $P_4$ and a decision is made whether the throttle valve is closed or not. If the throttle valve is not in its closed position which means that the engine is in usual operation, the program goes to a step $P_5$ and table look-up of a table is effected to find a value of spark advance corresponding to the engine revolution speed and load (induction vacuum, intake air flow, fuel injection pulse width, throttle valve degree or the like), resulting in issuance of an output via step $P_3$.

If, in step $P_4$, the throttle valve is in the closed position (that is, in the idle speed position), the program goes to a step $P_6$ and the engine coolant temperature is determined. If, in this case, the coolant temperature is higher than or equal to 50° C. (or is not lower than 50° C.), the program goes to a step $P_7$ to effect table look-up of the characteristic curve B shown in FIG. 2 because it is not necessary to rapidly warm up further. That is, no delay in spark advance takes place. If, in the step $P_6$, the coolant temperature is lower than 50° C., the program goes to a step $P_8$ and vehicle speed is decided. If the vehicle speed is higher than or equal to 8 km/h (or is not lower than 8 km/h), the program goes to step $P_7$ to use the characteristic curve B (FIG. 2) because, under this condition, a delay in spark advance angle has an inverse effect as will be hereinlater described. It therefore will be understood that the program goes to a step $P_9$ when the coolant temperature is lower than 50° C. (step $P_6$) and at the same time the vehicle speed is lower than 8 km/h (step $P_8$) and there is used the characteristic curve A shown in FIG. 2 which provides a delayed or a small value of spark advance.

The reason why the characteristic curve A or B is selectively used is as follows: Namely, if it is only necessary to distinguish between an idle operation after warm-up period and the adjacent slow operation, it is sufficient to set a constant spark advance value for the idle operation. But, if the spark advance is constant even when the engine is within a warm-up period, it causes a great amount of emission of HC and CO, thus being unfavorable for air pollution, because, within the warm-up period, the engine requires a very rich air fuel mixture. Thus, it is desirable to use a spark advance characteristic designed for rapid warm-up within the engine warm-up period, the spark advance characteristic being such that it provides a relatively delayed angle (i.e., a relatively small spark advance) for the purpose of rapidly shifting from a very rich state of air fuel mixture to the proper relatively lean state of air fuel mixture by accelerating the warm-up of the engine, and for the purpose of accelerating the warm-up of an exhaust gas purifier, such as a catalytic or thermal reactor, by elevating the exhaust gas temperature.

If the value of spark advance is delayed or made small, there is the tendency that the engine stability is deteriorated, therefore it is desirable to take the delayed spark advance value in accordance with the characteristic curve A only when the engine revolution speed is relatively high wherein the engine stability is better.

It seems as if a decision that the spark advance characteristic is changed from one to another in response to engine revolution speed is not included in the flow chart shown in FIG. 3. However, since the characteristic curve A and characteristic curve B merge when the engine revolution speed drops below 1,000 rpm as shown in FIG. 2, the thus delayed advance values are provided only when the engine revolution speed is higher than 1,000 rpm, presenting no problem even if no such decision is included in the flow chart.

It will hereinafter be explained why the characteristic curve B shows a constant value when the engine revolution speed is relatively low and shows values greater than this constant value when the engine revolution speed is relatively high. Usually the engine revolution speed when the engine is idling is apt to fluctuate. If the spark advance value also fluctuates in accordance with the fluctuation of the engine speed during idling, the fluctuation in engine revolution speed at an idle speed is prompted or increased, thus necessitating that a spark advance be constant when the engine is idling, namely, when the engine revolution speed is below 1,000 rpm in the case of FIG. 2. But, if the value of spark advance remains always constant when the throttle valve is in the closed position, as the throttle valve is closed during high speed engine operation, the value of spark advance becomes so small as to cause misfire, thereby to issue unburnt hydrocrabon (HC). Thus, the value of spark advance should increase as the engine revolution speed increases, as shown by the characteristic curve B, so as to provide the optimum spark advance value for a deceleration operation. The characteristic curve B is similar to the conventional engine-speed spark-advance characteristic curve provided by a centrifugal governor type spark advance mechanism, but differs greatly from the latter in that, in the conventional case, the characteristic is determined based upon the torque at the fully open position of the throttle valve and knocking, while the characteristic of the curve B shown in FIG. 2 is determined based upon the demand during deceleration operation. Since the greatest or maximum spark advance value is actually limited by the nature of a circuit, the characteristic curve B shown in FIG. 2 shows a constant advance value at engine revolution speeds above 2,000 rpm.

Hereinafter, a description is made as to the characteristic curve A shown in FIG. 2. With the characteristic of the curve B only, during fast idling within warm-up period, an increase in engine revolution speed causes an increase in spark advance and in torque (i.e., a torque generated within the engine and not such a torque performing a work externally), resulting in an increase in engine revolution speed, while a drop in engine revolution speed causes the spark advance to shift in a delayed direction, resulting in a further drop in revolution speed, and this positive feed back causes a hunting. Thus employing the reverse characteristic shown in the characteristic curve A induces a negative feed back, thus resulting in stable revolution and rapid warm-up because of relatively delayed angle spark advance.

If it is intended to selectively use characteristic curve A or B, complicated mechanism, cost increase and reliability drop are unavoidable according to the conventional mechanical system. However, according to the present invention, since a processor constructed of semiconductors, for example, a microcomputer, is used, the same is accomplished simply and without any substantial cost increase only by adding a program to the existing one.

Means for detecting no load may take the form of a throttle fully closed position responsive switch because this switch is the most reliable, inexpensive and its output signal is easily adaptable to a digital computer system because the signal is of ON-OFF type. In the case where there is a sensor installed which detects and provides an analog type signal representing the opening degree of the throttle valve for the purpose of detecting load to effect correction during acceleration or deceleration control, this sensor can be utilized by providing an arrangement which regards the state when the throttle opening degree is within a predetermined tolerance for idle adjustment as no load.

The reason for providing delayed spark advance values when the vehicle speed is low is as follows. Since the above mentioned throttle valve fully closed position responsive switch, which is closed whenever the engine operates with no load, closes to become ON even during braking for deceleration, it follows that the engine operates with delayed advance values during deceleration even when the engine does not complete its warm-up period, thereby to induce misfire causing a great amount of emission of unburnt hydrocarbon (HC) under this condition, so in order to prevent this reverse effect, it is desired to effect a shift to a delayed advance value only when the vehicle speed is lower than a predetermined vehicle speed value below which the above mentioned problem is unlike to occur.

Figure 4:
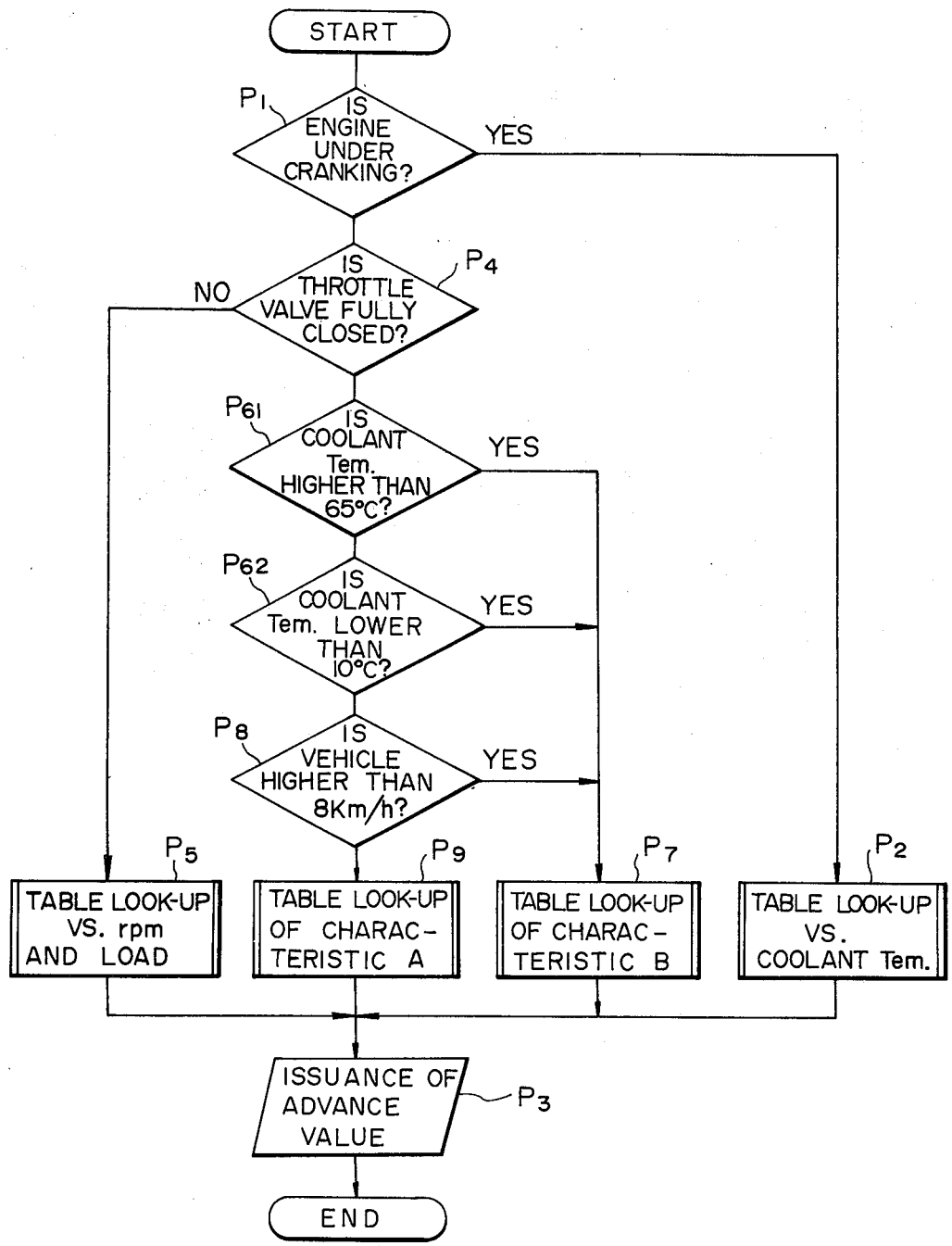
FIG. 4 is a flow chart illustrative of another example of the operation of the central processor to determine the value of spark advance.

FIG. 4 is a flow chart illustrative of the operation of another embodiment of the present invention, wherein the spark advance characteristic for a warm-up period is provided when the engine temperature is higher than a first predetermined value $T_A$ and lower than a second predetermined value $T_B$. FIG. 4 is different from FIG. 3 in that instead of the step $P_6$ in FIG. 3 which decides whether the coolant temperature is higher than or lower than 50° C., two steps $P_{61}$ and $P_{62}$ are provided wherein in $P_{61}$ a decision is made whether the coolant temperature is lower or higher than 65° C. (corresponding to the second predetermined value $T_B$) and in $P_{62}$ a decision is made whether the coolant temperature is higher or lower than 10° C. (corresponding to the first predetermined value $T_A$).

Although one object of the present invention is to reduce the emission of noxious contents by accomplishing rapid warm-up of the engine, delaying the advance angle for the purpose of rapid warm-up of the engine, however, is disadvantageous for the engine stability and fuel economy, so it is good to effect a delay in spark advance only when the degree of engine stability is good. The degree of engine stability is not recognized as a problem under the ordinary-in-use atmospheric temperature range from 20° C. to 30° C. However, since the spark advance value is delayed when the combustion environment conditions are severe, i.e., the ambient temperature is lower than 0° C., the delay should be effected when the engine temperature is higher than a relatively low predetermined temperature value, and since there is no need to effect the delay upon re-start of the engine when the engine has been warmed-up, the delay in advance value should be effected when the engine temperature is lower than a relatively high predetermined temperature value. These make up the bulk of the reasons why the delay is effected within the predetermined temperature range.

Figure 5:
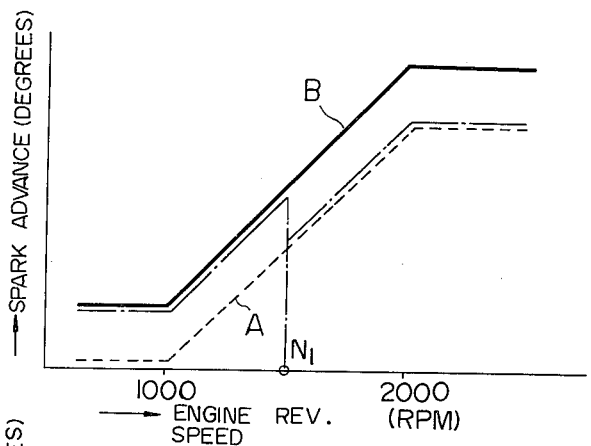
FIGS. 5, 6, 7, 8 and 9 are graphs illustrative of how a relatively delayed characteristic curve for spark advance is obtained.

Hereinafter, other embodiments according to the present invention are disclosed in FIGS. 5-9 which concern how to provide the so-called delayed spark advance characteristic A. Referring to FIG. 5, the advance values on the ordinary-in-use advance characteristic B are reduced by a constant value by substraction to make a delayed advance characteristic A, and therefore this subtraction corresponds to a parallel displacement in FIG. 5 from the solid line representing the ordinary-in-use characteristic B to the broken line representing the delayed advance characteristic A. This is the easiest way, but, with this, the spark advance values for revolution speeds adjacent the idle speed are so delayed. As a countermeasure to it, it can be considered to add a revolution speed decision step by setting a predetermined revolution speed $N_1$ wherein when the actual revolution speed is lower than the predetermined revolution speed value $N_1$, the ordinary-in-use characteristic B is provided and when the actual revolution speed is higher than the predetermined revolution speed value $N_1$, a delayed advance characteristic A is provided, thus providing a characteristic as represented by a curve as shown by one-dot chain line. As will be understood from this characteristic curve, the advance value changes stepwise at the predetermined speed value $N_1$, thereby to cause a little hunting. The advantage according to the way of FIG. 5 is that the capacity required for programming is made small.

Figure 6:
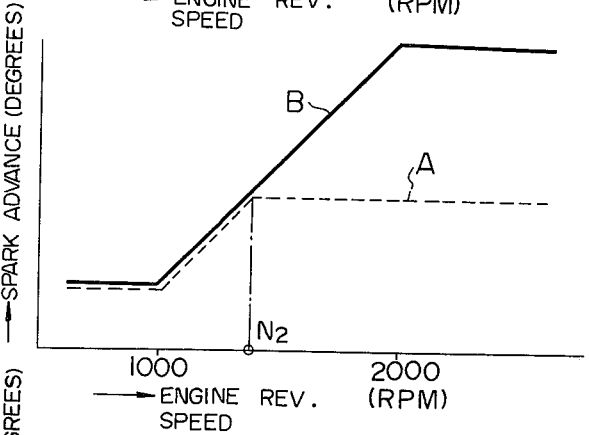
Figure 7:
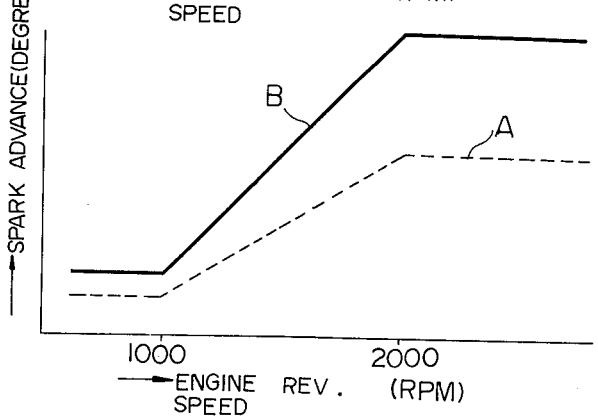
Figure 8:
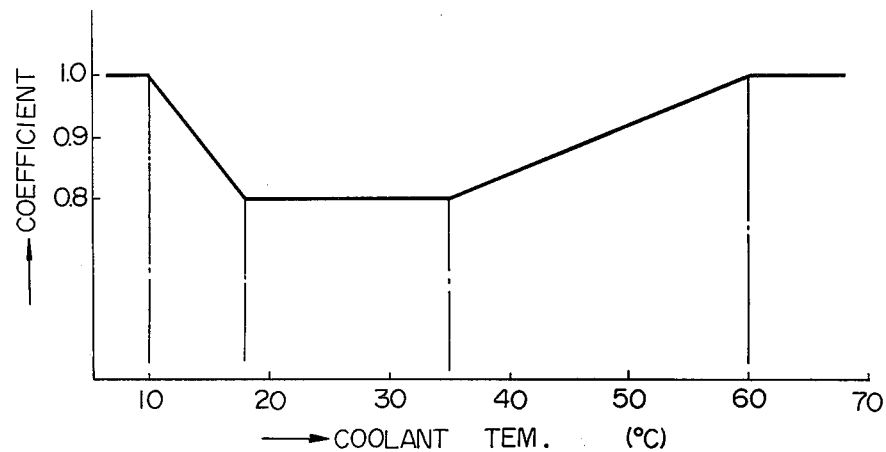
Figure 9:
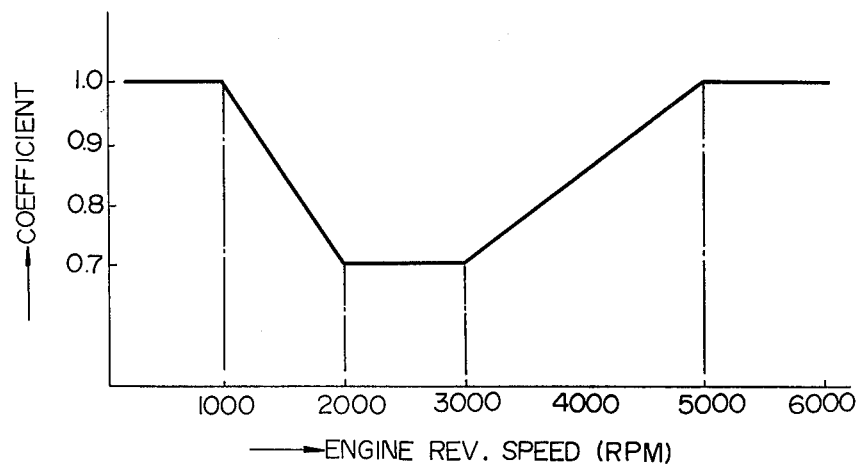

Referring to FIG. 6, a certain upper limit value is set, and a spark advance characteristic A, as shown in the broken line, wherein the spark advance value above the revolution speed $N_2$ is limited to this upper limit value, is provided. The delay is small here as compared to the characteristic A shown in FIG. 2, accordingly giving a smaller effect on rapid warm-up as compared to the case of FIG. 2. But the advantage is that the program capacity can be made small similarly to FIG. 5. Referring to FIG. 7, a spark advance characteristic A is provided by multiplying a constant coefficient to the ordinary-in-use characteristic B, and this has an advantage that the program capacity can be made small. It gives a smaller effect on rapid warm-up similarly to FIG. 6. Besides, it is experienced that, in the event fast idle speed does not increase sufficiently within the warm-up period, the spark advance is apt to be delayed. In the above description as to FIG. 7, the multiplication has been carried out with the constant coefficient to provide the delayed characteristic A, but FIG. 8 shows a coefficient value which varies in accordance with the engine coolant temperature, while FIG. 9 shows a coefficient value which varies in accordance with the engine revolution speed. These coefficient values are used as multiplying factors to obtain the respective delayed advance degree characteristics A from the ordinary-in-use characteristic B. In FIG. 9, advance values are 10 when the engine revolution speeds are lower than 1,000 rpm for the engine stability at low revolution speeds. Thus during this operating condition no delayed advance takes place. When the revolution speed is higher than 5,000 rpm, i.e., within high speed range, the delayed advance degree for the purpose of rapid warm-up of the engine is not necessary so that no delay in advance degree takes place.

It will now be understood from the preceding description that according to the present invention the optimum spark advance characteristic for low load engine operation is provided without deteriorating engine stability at idling operation, and without any deterioration in driveability the optimum spark advance characteristic for rapid engine warm-up is provided.

In the practice of the invention, the inventor has used a Hitachi Model No. HD 46802 central processor. A Hitachi Model No. HD 46506 input-output control unit compatible with the processor has been used.

The basic angle sensor 4 and unit angle sensor 5 are also conventional and may be in the form of a detecting unit 24 described in U.S. Pat. No. 4,015,565, filed Apr. 5, 1977 in the name of Aono et al. and entitled "SPARK-ADVANCE CONTROL APPARATUS FOR INTERNAL COMBUSTION ENGINE" (which is incorporated by reference) or may be in the form of a speed-electrical transducer 10 described in U.S. Pat. No. 3,853,103, filed Dec. 10, 1974 in the name of Wahl et al. (assignee: Robert Bosch GmbH) and entitled "IGNITION TIMING CONTROL SYSTEM FOR INTERNAL COMBUSTION ENGINE IGNITION SYSTEMS" which is also incorporated by reference.

A way to find or sense revolution speed of engine, i.e., engine rpm, based upon a signal from the unit angle sensor is conventional and described in the above-mentioned U.S. Pat. No. 3,853,103. In this respect, reference is made to U.S. Pat. No. 3,969,614, filed July 13, 1976 in the name of Moyer et al. and entitled "METHOD AND APPARATUS FOR ENGINE CONTROL" and reference is also made to U.S. Pat. No. 4,009,699, filed Mar. 1, 1977 in the name of Hetzler et al. and entitled "DIGITAL IGNITION SPARK TIMING ANGLE CONTROL WITH READ ONLY MEMORY."

The inventor has used a breakerless ignition system employing an ignition coil and a power transistor.

A way to determine the instance of ignition based upon binary signals of the basic angle sensor and unit angle sensor is disclosed in U.S. Pat. No. 3,853,103 in the name of Wahl et al. and U.S. Pat. No. 4,015,565 in the name of Aono et al.

In a four-cylinder, four-cycle internal combustion engine, each one ignition pulse must be obtained after each revolution of the crank shaft by 180°; i.e. at 180° after the first ignition pulse is derived, a second basic angle pulse must then be provided by the basic angle sensor. In this case, the basic angle sensor must be designed to provide a basic angle pulse after each revolution of the crank shaft by 180°.

In a six-cylinder, four-cycle internal combustion engine, each one ignition must be obtained after each revolution of the crank shaft by 120°, i.e. at 120° after the first ignition pulse is derived, a second basic angle pulse must then be provided by the basic angle sensor. In this case, the basic angle sensor must be designed to provide a basic angle pulse after each revolution of the crank shaft by 120°.

What is claimed is:

1. A method for the control of an ignition system spark timing for a spark ignition internal combustion engine for an automotive vehicle, said method comprising:

a step of detecting a condition that the engine is under cranking to provide a cranking signal indicating that the engine is under cranking;

a step of detecting a condition that said engine is in operation with no load to provide a no load indicative signal indicating that said engine is in operation with no load;

a step of detecting the engine temperature of said engine to provide a temperature signal indicating that the engine temperature is higher than a predetermined engine temperature value;

a step of detecting the vehicle speed of said automotive vehicle to provide a vehicle speed signal indicating that the vehicle speed is higher than a predetermined vehicle speed value;

a step of determining a value of spark advance vs. engine speed from a first predetermined spark advance characteristic of a plurality of spark advance vs. engine speed values in response to the absence of said cranking signal, the presence of said no load indicative signal, the absence of said temperature signal, and the presence of said vehicle speed signal; and a step of determining a value of spark advance from a second predetermined spark advance vs. engine speed characteristic of a plurality of values of spark advance vs. engine speed values in response to to the absence of said cranking signal, the presence of said no load indicative signal, the presence of said temperature signal, and the absence of said vehicle speed signal, said second predetermined spark advance vs. engine speed characteristic being a delayed spark advance characteristic and distinct from said first predetermined spark advance vs. engine speed characteristic; and a step of producing a spark in accordance with that value of spark advance which has been determined for at least the detected temperature and vehicle speed of such vehicle by said determining steps.

2. A method for the control of an ignition system spark timing for a spark ignition internal combustion engine for an automotive vehicle, said method comprising:

a step of detecting a condition that the engine is under cranking to provide a cranking signal indicating that the engine is under cranking;

a step of detecting a condition that said engine is in operation with no load to provide a no load indicative signal indicating that said engine is in operation with no load;

a step of detecting the engine temperature of said engine when in operation to provide a temperature signal indicating that the engine temperature is higher than a first predetermined engine temperature value and lower than a second predetermined engine temperature value which is higher than said predetermined engine temperature value;

a step of detecting the vehicle speed of said automotive vehicle speed of said automotive vehicle to provide a vehicle speed signal indicating that the vehicle speed is higher than a predetermined vehicle speed value;

a step of determining a value of spark advance from a first predetermined spark advance vs. engine speed characteristic of a plurality of spark advance vs. engine speed values in response to the absence of said cranking signal, the presence of said no load indicative signal, the absence of said temperature signal, and the presence of said vehicle speed signal; and a step of determining a value of spark advance vs. engine speed along with a second predetermined spark advance characteristic of a plurality of spark advance vs. engine speed values in response to the absence of said cranking signal, the presence of said no load indicative signal, the presence of said temperature signal, and the absence of said vehicle speed signal, said second predetermined spark advance vs. engine speed characteristic being a delayed spark advance characteristic and distinct from said first predetermined spark advance vs. engine speed characteristic; and a step of producing a spark in accordance with that value of spark advance with has been determined for at least the detected temperature and vehicle speed of said vehicle by said determining step.

3. A method as claimed in claims 1 or 2, wherein said first predetermined spark advance vs. engine speed characteristic provides a constant value of spark advance irrespective of the engine speed as long as the engine speed is lower than a predetermined engine speed value and a value of spark advance which continuously increases as the engine speed increases as long as the engine speed is higher than said predetermined engine speed value, and wherein said second predetermined spark advance vs. engine speed characteristic provides said constant value of spark advance irrespective of the engine speed as long as the engine speed is lower than said predetermined engine speed value and provides a value of spark advance which continuously decreases as the engine speed increases as long as the engine speed is higher than said predetermined engine speed value.

4. A method as claimed in claims 1 or 2, wherein said first predetermined spark advance vs. engine speed characteristic provides a constant spark advance value irrespective of the engine speed as long as the engine speed is lower than a predetermined engine speed value and a value of spark advance which continuously increases as the engine speed increases as long as the engine speed is higher than said predetermined engine speed value, and wherein said second predetermined spark advance vs. engine speed characteristic provides a value of spark advance which is smaller than any corresponding spark advance value given by said first predetermined spark advance vs. engine speed characteristic.

5. A method as claimed in claims 1 or 2, wherein said first predetermined spark advance vs. engine speed characteristic provides a constant spark advance value irrespective of the engine speed as long as the engine speed is lower than a predetermined engine speed value and a value of spark advance which continuously increases as the engine speed increases, and wherein said second predetermined spark advance vs. engine speed characteristic provides a value of spark advance which is smaller than any corresponding value of spark advance given by said first predetermined spark advance vs. engine speed characteristic.

6. An apparatus for the control of an ignition system spark timing for a spark ignition internal combustion engine, said apparatus comprising:

means for detecting a condition that said engine is in operation with no load to provide a no load indicative signal indicating that said engine is in operation with no load;

a micro processor responsive to at least said no load indicative signal, said micro processor including a read-only-memory storing a first predetermined spark advance vs. engine speed characteristic and a second predetermined spark advance vs. engine speed characteristic which is distinct from said first predetermined spark advance vs. engine speed characteristic and a central processing unit which performs a table look-up of said first predetermined spark advance vs. engine speed characteristic stored in said read-only-memory in response to the absence of said no load indicative signal to determine a value of spark advance and performs a table look-up of said second predetermined spark advance vs. engine speed characteristic stored in said read-only-memory in response to the presence of said no load indicative signal to determine a value of spark advance, said micro processor generating an output signal indicative of that value of spark advance which has been determined by said central processing unit; and means for producing a spark in response to said output signal.

7. An apparatus as claimed in claim 6, wherein said second predetermined spark advance vs. engine speed characteristic provides a constant value of spark advance irrespective of the engine speed.

8. An apparatus as claimed in claim 6, wherein said second predetermined spark advance vs. engine speed characteristic provides a constant value of spark advance irrespective of engine speed when the engine speed is lower than a predetermined engine speed value.

9. An apparatus as claimed in claim 8, wherein said second predetermined spark advance vs. engine speed characteristic provides a value of spark advance which increases from said constant value of spark advance as the vehicle speed increases as long as the vehicle speed is higher than said predetermined engine speed value.

10. An apparatus for the control of an ignition system spark timing for a spark ignition internal combustion engine for an automotive vehicle, said apparatus comprising:

means for detecting a condition that the engine is under cranking to provide a cranking signal indicating that the engine is under cranking;

means for detecting a condition that said engine is in operation with no load to provide a no load indicative signal indicating that said engine is in operation with no load;

means for detecting the engine temperature of said engine to provide a temperature signal indicating that the engine temperature is higher than a predetermined engine temperature value;

means for detecting the vehicle speed of said automotive vehicle to provide a vehicle speed signal indicating that the vehicle speed is higher than a predetermined vehicle speed value;

a micro processor responsive to said cranking signal, said no load indicative signal, said temperature signal, and said vehicle speed signal, said micro processor including a read-only-memory storing a first predetermined spark advance vs. engine speed characteristic and a second predetermined spark advance vs. engine speed characteristic which is distinct from said first predetermined spark advance vs. engine speed characteristic and a central processing unit which performs a table look-up of said first predetermined spark advance vs. engine speed characteristic stored in said read-only-memory in response to the absence of said cranking signal, the presence of said no load indicative signal, the presence of said temperature signal, and the presence of said vehicle speed signal to determine a value of spark advance and performs a table look-up of said second predetermined spark advance vs. engine speed characteristic stored in said read-only-memory in response to the absence of said cranking signal, the presence of said no load signal, the absence of said temperature signal, and the absence of said vehicle speed signal to determine an instantaneous value of spark advance, said micro processor generating an output signal indicative of that value of spark advance which has been determined; and means for producing a spark in response to said output signal.

11. An apparatus for the control of an ignition system spark timing for a spark ignition internal combustion engine for an automotive vehicle, said apparatus comprising:

means for detecting a condition that the engine is under cranking to provide a cranking signal indicating that the engine is under cranking;

means for detecting a condition that said engine is in operation with no load to provide a no load indicative signal indicating that said engine is in operation with no load;

means for detecting the engine temperature of said engine to provide a temperature signal indicating that the engine temperature is higher than a first predetermined engine temperature value and lower than a second predetermined engine temperature value which is higher than said first predetermined engine temperature value;

means for detecting the vehicle speed of said automotive vehicle to provide a vehicle speed signal indicating that the vehicle speed is higher than a predetermined vehicle speed value;

a micro processor responsive to said cranking signal, said no load indicative signal, said temperature signal, and said vehicle speed signal, said micro processor including a read-only-memory storing a first predetermined spark advance vs. engine speed characteristic and a second predetermined spark advance vs. engine speed characteristic which is distinct from said first predetermined spark advance vs. engine speed characteristic and a central processing unit which performs a table look-up of said first predetermined spark advance vs. engine speed characteristic in response to the absence of said cranking signal, the presence of said no load indicative signal, the absence of said temperature signal, and the presence of said vehicle speed signal to determine a value of spark advance and performs a table look-up of said second predetermined spark advance vs. engine speed characteristic stored in said read-only-memory in response to the absence of said cranking signal, the presence of said no load indicative signal, the presence of said temperature signal, and the absence of said vehicle speed signal to determine a value of spark advance, said micro processor generating an output signal indicative of that value of spark advance which has been determined; and means for producing a spark in response to said output signal.

12. An apparatus as claimed in claims 10 or 11, wherein said first predetermined spark advance vs. engine speed characteristic provides a constant value of spark advance irrespective of the engine speed as long as the engine speed is lower than a predetermined engine speed value and a value of spark advance which continuously increases as the engine speed increases as long as the engine speed is higher than said predetermined engine speed value, and wherein said second predetermined spark advance vs. engine speed characteristic provides said constant value of spark advance irrespective of the engine speed as long as the engine speed is lower than said predetermined engine speed value and provides a value of spark advance which continuously decreases as the engine speed increases as long as the engine speed is higher than said predetermined engine speed value.

13. An apparatus as claimed in claims 10 or 11, wherein said first predetermined spark advance vs. engine speed characteristic provides a constant value of spark advance irrespective of the engine speed as long as the engine speed is lower than a predetermined engine speed value and a value of spark advance which continuously increases as the engine speed increases as long as the engine speed is higher than said predetermined engine speed value, and wherein said second predetermined spark advance vs. engine speed characteristic provides a value of spark advance which is smaller than any corresponding spark advance value given by said first predetermined spark advance vs. engine speed characteristic.

14. An apparatus as claimed in claims 10 or 11, wherein said first predetermined spark advance vs. engine speed characteristic provides a constant value of spark advance irrespective of the engine speed as long as the engine speed is lower than a predetermined engine speed value and a value of spark advance which continuously increases as the engine speed increases, and wherein said second predetermined spark advance vs. engine speed characteristic provides a value of spark advance which is smaller than any corresponding value of spark advance given by said first predetermined spark advance vs. engine speed characteristic.

* * * * *

UNITED STATES PATENT AND TRADEMARK OFFICE
CERTIFICATE OF CORRECTION

PATENT NO. : 4,445,477
DATED : May 1, 1984
INVENTOR(S) : KENJI IKEURA

It is certified that error appears in the above-identified patent and that said Letters Patent is hereby corrected as shown below:

First sheet, Foreign Priority Data, should read:
-- April 19, 1979 [JP]   Japan....................54-47281 --.

Signed and Sealed this

Thirtieth Day of October 1984

[SEAL]

Attest:

GERALD J. MOSSINGHOFF

Attesting Officer

Commissioner of Patents and Trademarks